United States Patent
Tsuchida et al.

(10) Patent No.: US 9,680,179 B2
(45) Date of Patent: Jun. 13, 2017

(54) SULFIDE SOLID ELECTROLYTE MATERIAL, CATHODE BODY AND LITHIUM SOLID STATE BATTERY

(75) Inventors: Yasushi Tsuchida, Susono (JP); Noriaki Nishino, Suntou-gun (JP); Takamasa Ohtomo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 952 days.

(21) Appl. No.: 13/818,179

(22) PCT Filed: Aug. 19, 2011

(86) PCT No.: PCT/JP2011/069242
§ 371 (c)(1),
(2), (4) Date: Mar. 22, 2013

(87) PCT Pub. No.: WO2012/026561
PCT Pub. Date: Mar. 1, 2012

(65) Prior Publication Data
US 2013/0177821 A1    Jul. 11, 2013

(30) Foreign Application Priority Data
Aug. 26, 2010    (JP) ................................. 2010-189963

(51) Int. Cl.
*H01M 10/0562* (2010.01)
*H01M 4/131* (2010.01)
(Continued)

(52) U.S. Cl.
CPC ....... *H01M 10/0562* (2013.01); *H01M 4/131* (2013.01); *H01M 4/366* (2013.01);
(Continued)

(58) Field of Classification Search
None
See application file for complete search history.

(56) References Cited

U.S. PATENT DOCUMENTS

| | | |
|---|---|---|
| 4,331,750 A | 5/1982 | Malugani et al. |
| 4,585,714 A | 4/1986 | Akridge |

(Continued)

FOREIGN PATENT DOCUMENTS

| | | |
|---|---|---|
| CN | 101065327 A | 10/2007 |
| EP | 2 131 421 A1 | 12/2009 |

(Continued)

OTHER PUBLICATIONS

"Chapter: Ionization Energies of Atoms and Atomic Ions," CRC Handbook of Chemistry and Physics, 94$^{th}$ Edition, Internet Version 2014, pp. 10-197-10-199.

(Continued)

*Primary Examiner* — Maria J Laios
(74) *Attorney, Agent, or Firm* — Oliff PLC

(57) ABSTRACT

The main object of the present invention is to provide a sulfide solid electrolyte material which copes with both the restraint of the increase in interface resistance and the restraint of the increase in bulk resistance. The present invention solves the above-mentioned problems by providing a sulfide solid electrolyte material characterized by containing at least one of Cl and Br.

7 Claims, 4 Drawing Sheets

(51) Int. Cl.
H01M 4/36 (2006.01)
H01M 4/485 (2010.01)
H01M 10/052 (2010.01)

(52) U.S. Cl.
CPC ......... *H01M 4/485* (2013.01); *H01M 10/052* (2013.01); *H01M 2300/0068* (2013.01); *H01M 2300/0091* (2013.01); *H01M 2300/0094* (2013.01)

(56) References Cited

U.S. PATENT DOCUMENTS

| | | | |
|---|---|---|---|
| 4,599,284 | A | 7/1986 | Akridge |
| 5,085,953 | A | 2/1992 | Akridge et al. |
| 5,227,148 | A | 7/1993 | Akridge et al. |
| 6,368,746 | B1 * | 4/2002 | Takada .................... H01M 4/13 252/182.1 |
| 2001/0036577 | A1 | 11/2001 | Nakane et al. |
| 2007/0160911 | A1 | 7/2007 | Senga et al. |
| 2008/0057399 | A1 | 3/2008 | Visco et al. |
| 2009/0081553 | A1 | 3/2009 | Kondo et al. |
| 2009/0081554 | A1 * | 3/2009 | Takada et al. ................. 429/322 |
| 2010/0112440 | A1 | 5/2010 | Guyomard et al. |
| 2010/0273062 | A1 * | 10/2010 | Tsuchida ............... H01M 4/131 429/304 |
| 2011/0065007 | A1 * | 3/2011 | Kamiya ............ H01M 10/0562 429/322 |
| 2011/0167625 | A1 * | 7/2011 | Hama et al. ................. 29/623.1 |
| 2012/0231348 | A1 | 9/2012 | Ohtomo et al. |

FOREIGN PATENT DOCUMENTS

| | | |
|---|---|---|
| JP | A-4-231346 | 8/1992 |
| JP | A-5-306117 | 11/1993 |
| JP | A-5-306118 | 11/1993 |
| JP | A-5-306119 | 11/1993 |
| JP | A-11-144523 | 5/1999 |
| JP | A-2002-109955 | 4/2002 |
| JP | A-2003-217663 | 7/2003 |
| JP | A-2005-228570 | 8/2005 |
| JP | A-2008-103280 | 5/2008 |
| JP | A-2008-198620 | 8/2008 |
| JP | A-2009-117168 | 5/2009 |
| JP | A-2010-80168 | 4/2010 |
| JP | A-2010-146936 | 7/2010 |
| JP | A-2010-170715 | 8/2010 |
| WO | WO 2007/004590 A1 | 1/2007 |
| WO | WO 2010/038313 * | 4/2010 ............ H01M 10/36 |
| WO | WO 2010/038313 A1 | 4/2010 |
| WO | WO 2010/064127 A1 | 6/2010 |
| WO | WO 2010/106412 A1 | 9/2010 |
| WO | WO 2011/064662 A1 | 6/2011 |

OTHER PUBLICATIONS

Mizuno et al., "Design of Composite Positive Electrode in All-Solid-State Secondary Batteries with $Li_2S$—$P_2S_5$ Glass-Ceramic Electrolytes," *Journal of Power Sources*, 2005, vol. 146, pp. 711-714.

Chowdari et al., "Electrical and Electrochemical Characterization of $Li_2O$:$P_2O_5$:$Nb_2O_5$ Based Solid Electrolytes," *Journal of Non-Crystalline Solids*, 1989, vol. 110, pp. 101-110.

Fukushima et al., "Fabrication of Electrode-Electrolyte Interface in All-Solid-State Lithium Batteries Using the Thermal Softening-Adhesion Behavior of $Li_2S$—$P_2S_5$ Glass Electrolytes," *Abstract of lectures in Chemical Battery Material Study Group Meeting*, vol. 9, pp. 51-52 (with abstract).

Tomei et al., "Preparation of Amorphous Materials in the System LiI—$Li_2S$—$P_2S_5$ by Mechanical Milling and Their Lithium Ion Conducting Properties," Summary of $29^{th}$ Solid State Ionics Symposium, 2003, pp. 26-27 (with Abstract).

Deiseroth et al., "$LI_6PS_5X$: A Class of Crystalline Li-Rich Solids With an Unusually High $Li^+$ Mobility," *Angewandte Chem.*, 2008, vol. 47, pp. 755-758.

Mercier et al., "Superionic Conduction in $Li_2S$—$P_2S_5$—LiI—Glasses," *Solid State Ionics*, 1981, vol. 5, pp. 663-666.

Tomei et al., "Preparation of Amorphous Materials in the System LiI—$Li_2S$—$P_2S_5$ by Mechanical Milling and Their Lithium Ion Conducting Properties," *Summary of Solid State Ionics Symposium*, 2003, vol. 23, pp. 26-27 (with abstract).

Kennedy et al., "Further Characterization of $SiS_2$—$Li_2S$ Glasses Doped with Lithium Halide," *Journal of the Electrochemical Society*, 1988, vol. 135, No. 4, pp. 859-862.

Kennedy et al., "Preparation and Conductivity Measurements of $SiS_2$—$Li_2S$ Glasses Doped with LiBr and LiCl," *Solid States Ionics*, 1986, vols. 18 & 19, pp. 368-371.

Kennedy et al., "Glass Forming Region and Structure in $SiS_2$—$Li_2S$—LiX (X=Br, I)," *Journal of Solid State Chemistry*, 1987, vol. 69, pp. 252-257.

Oct. 29, 2014 Notice of Allowance issued in U.S. Appl. No. 13/318,222.

* cited by examiner

FIG. 3A
FIG. 3B
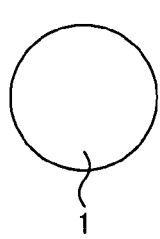
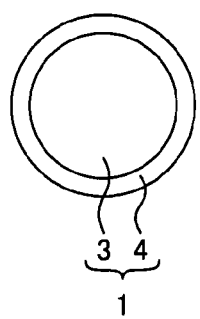
FIG. 4
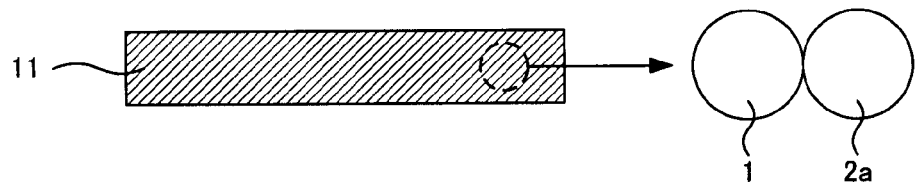
FIG. 5
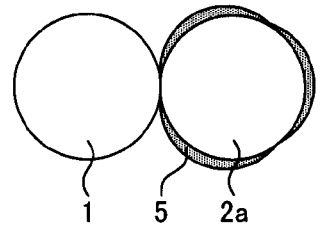
FIG. 6
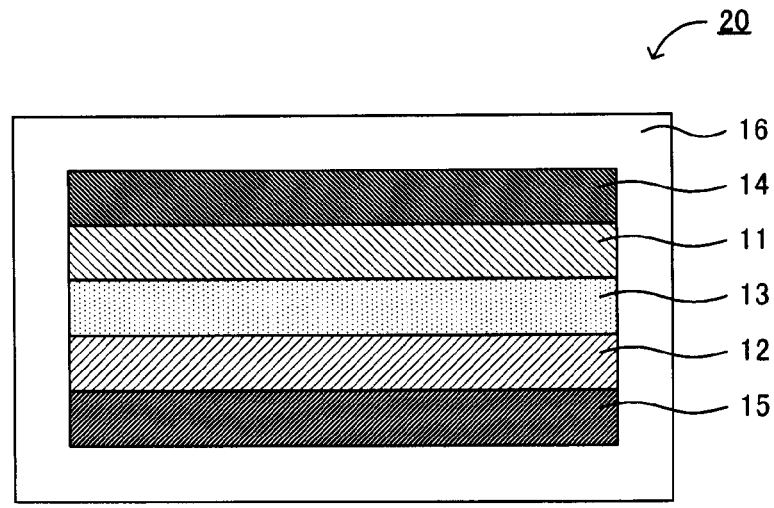

SULFIDE SOLID ELECTROLYTE MATERIAL, CATHODE BODY AND LITHIUM SOLID STATE BATTERY

TECHNICAL FIELD

The present invention relates to a sulfide solid electrolyte material which copes with both the restraint of the increase in interface resistance and the restraint of the increase in bulk resistance.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the industrial field such as the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery. In addition, a sulfide solid electrolyte material has been known as a solid electrolyte material used for such a solid electrolyte layer.

The sulfide solid electrolyte material is so high in Li ion conductivity as to be useful for intending higher output of a battery, and various kinds of research have been conventionally made. For example, in Patent Literature 1, $Li_2S$—$P_2S_5$-based lithium ion conductor crystal glass and a battery using this as a solid electrolyte are disclosed. Also, in Non Patent Literature 1, a sulfide solid electrolyte material with a ratio of $Li_2S/P_2S_5=2$, containing LiI, is disclosed. In addition, in Non Patent Literature 2, an LiI—$Li_2S$—$P_2S_5$-based amorphous material obtained by a mechanical milling method is disclosed. Also, in Patent Literature 2, in order to restrain a reaction of a cathode active material and a solid electrolyte, a nonaqueous electrolyte battery selecting a combination of the solid electrolytes for a specific combination is disclosed.

CITATION LIST

Patent Literature

Patent Literature 1: Japanese Patent Application Publication No. 2005-228570
Patent Literature 2: Japanese Patent Application Publication No. 2003-217663

Non Patent Literature

Non Patent Literature 1: Rene Mercier et al., "SUPERIONIC CONDUCTION IN $Li_2S$—$P_2S_5$—LiI-GLASSES", Solid State Ionics 5 (1981), 663-666

Non Patent Literature 2: Naoko Tomei, two others, "Preparation of Amorphous Materials in the system LiI—$Li_2S$—$P_2S_5$ by Mechanical Milling and Their Lithium Ion Conducting Properties", Summary of Solid State Ionics Symposium, Vol. 23 (2003), P. 26-27

SUMMARY OF INVENTION

Technical Problem

The problem is that a sulfide solid electrolyte material reacts with an electrode active material (particularly, a cathode active material) to form a high resistive layer on an interface between both and increase interface resistance. On the contrary, the inventors of the present invention obtain knowledge that the inclusion of fluorine in a sulfide solid electrolyte material restrains the increase in interface resistance. However, the problem is that a sulfide solid electrolyte material containing fluorine increases bulk resistance (decreases ion conductivity) even though it may restrain interface resistance from increasing. The present invention has been made in view of the above-mentioned problems, and the main object thereof is to provide a sulfide solid electrolyte material which copes with both the restraint of the increase in interface resistance and the restraint of the increase in bulk resistance.

Solution to Problem

To solve the above-mentioned problems, the present invention provides a sulfide solid electrolyte material containing at least one of Cl and Br.

The present invention allows a sulfide solid electrolyte material which copes with both the restraint of the increase in interface resistance and the restraint of the increase in bulk resistance by reason of containing at least one of Cl and Br.

In the above-mentioned invention, at least one of the Cl and Br is preferably dispersed. The reason therefor is that a sulfide solid electrolyte material is easily produced.

In the above-mentioned invention, the sulfide solid electrolyte material preferably comprises a core portion with ion conductivity and a covered portion for covering a surface of the core portion; wherein the covered portion contains at least one of the Cl and Br. The reason therefor is that interface resistance may be effectively restrained from increasing.

Furthermore, the present invention provides a sulfide solid electrolyte material comprising a core portion with ion conductivity and a covered portion for covering a surface of the core portion; characterized in that the covered portion contains I.

The present invention allows a sulfide solid electrolyte material which copes with both the restraint of the increase in interface resistance and the restraint of the increase in bulk resistance for the reason that a covered portion contains I.

In the above-mentioned invention, the sulfide solid electrolyte material preferably contains Li, X (X is P, Si, Ge, Al or B), and S. The reason therefor is to allow a sulfide solid electrolyte material with high Li ion conductivity.

In the above-mentioned invention, the sulfide solid electrolyte material preferably contains a $PS_4^{3-}$ structure as a main body. The reason therefor is to allow a sulfide solid electrolyte material with less hydrogen sulfide generation amount.

Furthermore, the present invention provides a cathode body comprising a cathode active material and a sulfide solid electrolyte material which reacts with the cathode active material and forms a high resistive layer; characterized in that the sulfide solid electrolyte material contains at least one of Cl, Br and I.

The present invention allows a cathode body which copes with both the restraint of the increase in interface resistance and the restraint of the increase in bulk resistance for the reason that a sulfide solid electrolyte material contains at least one of Cl, Br and I.

In the above-mentioned invention, the cathode active material is preferably an oxide cathode active material. The reason therefor is to react with a sulfide solid electrolyte material to easily form a high resistive layer. An oxide cathode active material also has the advantage that energy density is high.

In the above-mentioned invention, the oxide cathode active material is preferably a rock salt bed type active material.

In the above-mentioned invention, a coating layer of an oxide is preferably formed on a surface of the cathode active material. The reason therefor is that a cathode active material and a sulfide solid electrolyte material may be further restrained from reacting to form a high resistive layer.

In the above-mentioned invention, the sulfide solid electrolyte material preferably contains Li, X (X is P, Si, Ge, Al or B), and S. The reason therefor is to allow a sulfide solid electrolyte material with high Li ion conductivity.

In the above-mentioned invention, the sulfide solid electrolyte material preferably contains a $PS_4^{3-}$ structure as a main body. The reason therefor is to allow a sulfide solid electrolyte material with less hydrogen sulfide generation amount.

Furthermore, the present invention provides a lithium solid state battery comprising a cathode active material layer, an anode active material layer, and a solid electrolyte layer formed between the cathode active material layer and the anode active material layer; characterized in that the cathode active material layer is the cathode body.

The present invention allows a lithium solid state battery which copes with both the restraint of the increase in interface resistance and the restraint of the increase in bulk resistance by reason of using the above-mentioned cathode body as a cathode active material layer.

Advantageous Effects of Invention

The present invention produces the effect such as to allow a sulfide solid electrolyte material which copes with both the restraint of the increase in interface resistance and the restraint of the increase in bulk resistance.

BRIEF DESCRIPTION OF DRAWINGS

FIGS. 3A and 3B are each a schematic cross-sectional view showing a sulfide solid electrolyte material of the present invention.

FIG. 4 is a schematic view showing an example of a cathode body of the present invention.

FIG. 5 is a schematic cross-sectional view explaining a cathode body of the present invention.

FIG. 6 is a schematic cross-sectional view showing an example of a lithium solid state battery of the present invention.

DESCRIPTION OF EMBODIMENTS

A sulfide solid electrolyte material, a cathode body and a lithium solid state battery of the present invention are hereinafter described in detail.
A. Sulfide Solid Electrolyte Material A sulfide solid electrolyte material of the present invention is first described. A sulfide solid electrolyte material of the present invention may be roughly divided into two embodiments. A sulfide solid electrolyte material of the present invention is hereinafter described while divided into a first embodiment and a second embodiment.
1. First Embodiment A sulfide solid electrolyte material of a first embodiment is characterized by containing at least one of Cl and Br.

Figure 1A:
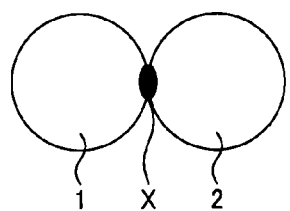
FIGS. 1A and 1B are each a schematic cross-sectional view explaining an interface between a sulfide solid electrolyte material and an electrode active material.

The first embodiment allows a sulfide solid electrolyte material which copes with both the restraint of the increase in interface resistance and the restraint of the increase in bulk resistance by reason of containing at least one of Cl and Br. Here, as shown in FIG. 1A, conventionally, the problem is that a sulfide solid electrolyte material 1 and an electrode active material 2 react on an interface between both to form a high resistive layer X and increase interface resistance. It has been known as a means of solving this problem that a coating layer such as $LiNbO_3$ is provided for the surface of the electrode active material 2. However, even though the coating layer is provided for the surface of the electrode active material, it has been difficult to prevent a high resistive layer from being formed for the reason that it is difficult that the surface of the electrode active material is completely covered with the coating layer at a desired thinness, and adhesion properties between the electrode active material and the coating layer are so weak that the coating layer peels off easily due to shearing stress.

Figure 1B:
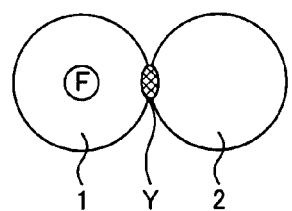

On the contrary, the inventors of the present invention, as shown in FIG. 1B, has confirmed that the introduction of fluorine (F) into the sulfide solid electrolyte material 1 may restrain interface resistance from increasing due to the formation of a high resistive layer. It is conceived that the reason why interface resistance may be restrained from increasing is that fluorine contained in the sulfide solid electrolyte material 1 and metal contained in the electrode active material 2 to form stable fluoride Y on an interface between the sulfide solid electrolyte material 1 and the electrode active material 2. However, the problem is that the sulfide solid electrolyte material containing fluorine increases bulk resistance (decreases ion conductivity) even though it may restrain interface resistance from increasing.

Figure 2A:
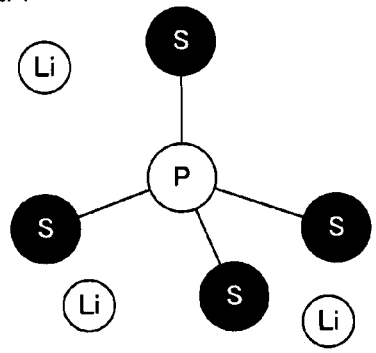
FIGS. 2A to 2C are schematic views explaining an effect of the present invention.
Figure 2B:
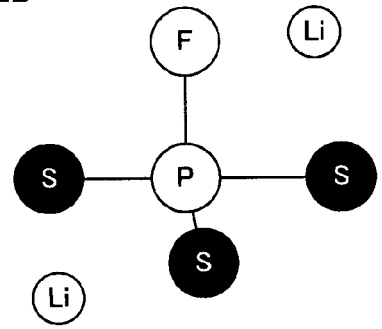
Figure 2C:
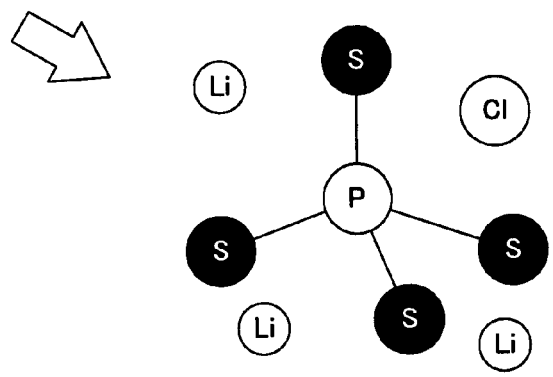

It is probably conceived that the reason why bulk resistance increases is that the introduction of fluorine with large electronegativity and high reactivity substitutes sulfur (S) of a structural unit (a unit) in charge of ionic conduction with fluorine (F) to inhibit ionic conduction. For example, as shown in FIG. 2A, a sulfide solid electrolyte material ($Li_3PS_4$) having a composition of $75Li_2S \cdot 25P_2S_5$ has a $PS_4^{3-}$ structure, which contributes greatly to Li ionic conduction. It is conceived that the introduction of fluorine into such a sulfide solid electrolyte material, as shown in FIG. 2B, substitutes sulfur (S) of the $PS_4^{3-}$ structure with fluorine (F) to inhibit Li ionic conduction. On the contrary, in the first embodiment, as shown in FIG. 2C, the introduction of chlorine or bromine with lower reactivity than fluorine, which is the same halogen as fluorine, causes no above-mentioned substitution. As a result, a sulfide solid electrolyte material which copes with both the restraint of the increase in interface resistance and the restraint of the increase in bulk resistance is allowed.

(1) Sulfide Solid Electrolyte Material

A sulfide solid electrolyte material of the first embodiment ordinarily reacts with an electrode active material to form a high resistive layer. The formation of a high resistive layer may be confirmed by a transmission electron microscope (TEM) and an energy-dispersive x-ray spectroscopy (EDX). The above-mentioned sulfide solid electrolyte material has ion conductivity. A conducting metal ion is not particularly limited and examples thereof include Li ion, Na ion, K ion, Mg ion and Ca ion, and Li ion is preferable among them. The reason therefor is to allow a sulfide solid electrolyte material useful for a lithium solid state battery.

The composition of a sulfide solid electrolyte material of the first embodiment is not particularly limited if it is a composition containing at least one of Cl and Br. Above all, a sulfide solid electrolyte material of the first embodiment preferably contains Li, X (X is P, Si, Ge, Al or B), and S in addition to at least one of Cl and Br. The reason therefor is to allow a sulfide solid electrolyte material with high Li ion conductivity. The above-mentioned X is particularly preferably P. Also, the above-mentioned X may contain the above-mentioned element by two kinds or more.

In the case where the above-mentioned X is P, the above-mentioned sulfide solid electrolyte material preferably contains the $PS_4^{3-}$ structure as the main body. The reason therefor is to allow a sulfide solid electrolyte material with less hydrogen sulfide generation amount. The phrase "contains the $PS_4^{3-}$ structure as the main body" signifies that the ratio of the $PS_4^{3-}$ structure in all anion structures is 50 mol % or more; the ratio of the $PS_4^{3-}$ structure is preferably 60 mol % or more, more preferably 70 mol % or more, far more preferably 80 mol % or more, and particularly preferably 90 mol % or more. In particular, the above-mentioned sulfide solid electrolyte material preferably has only the $PS_4^{3-}$ structure. The ratio of the $PS_4^{3-}$ structure may be determined by Raman spectroscopy, NMR (for example, $^{31}P$ MAS NMR) and XPS.

In the case where the above-mentioned X is Si, Ge, Al or B, the above-mentioned sulfide solid electrolyte material preferably contains $SiS_4^{4-}$ structure, $GeS_4^{4-}$ structure, $AlS_3^{3-}$ structure and $BS_3^{3-}$ structure respectively as the main body. The definition of the main body and the measuring method for the ratio of each structure are the same as the contents described above.

Also, a sulfide solid electrolyte material of the first embodiment is preferably obtained by using a raw material composition containing $Li_2S$, sulfide of X (X is P, Si, Ge, Al or B), and at least one of a Cl-containing compound and a Br-containing compound.

$Li_2S$ contained in a raw material composition preferably has fewer impurities. The reason therefor is to allow a side reaction to be restrained. Examples of a synthesis method for $Li_2S$ include a method described in Japanese Patent Application Publication No. H07-330312. In addition, $Li_2S$ is preferably purified by using a method described in WO2005/040039. On the other hand, examples of sulfide of the above-mentioned X contained in a raw material composition include $P_2S_3$, $P_2S_5$, $SiS_2$, $GeS_2$, $Al_2S_3$ and $B_2S_3$.

A Cl-containing compound contained in a raw material composition is not particularly limited if it contains chlorine, and examples thereof include LiCl. A Br-containing compound contained in a raw material composition is not particularly limited if it contains bromine, and examples thereof include LiBr.

It is preferable that the above-mentioned sulfide solid electrolyte material does not substantially contain $Li_2S$. The reason therefor is to allow a sulfide solid electrolyte material with less hydrogen sulfide generation amount. $Li_2S$ reacts with water to generate hydrogen sulfide. For example, a larger ratio of $Li_2S$ contained in a raw material composition survives $Li_2S$ more easily. The situation "does not substantially contain $Li_2S$" may be confirmed by X-ray diffraction. Specifically, in the case of not having a peak of $Li_2S$ ($2\theta=27.0°$, $31.2°$, $44.8°$ and $53.1°$, "does not substantially contain $Li_2S$" may be determined.

It is preferable that the above-mentioned sulfide solid electrolyte material does not substantially contain cross-linking sulfur. The reason therefor is to allow a sulfide solid electrolyte material with less hydrogen sulfide generation amount. The term "cross-linking sulfur" signifies cross-linking sulfur in a compound obtained by a reaction of $Li_2S$ and sulfide of the above-mentioned X. For example, cross-linking sulfur with an $S_3P$—S—$PS_3$ structure obtained by a reaction of $Li_2S$ and $P_2S_5$ corresponds thereto. Such cross-linking sulfur reacts easily with water to easily generate hydrogen sulfide. In addition, the situation "does not substantially contain cross-linking sulfur" may be confirmed by measuring Raman spectroscopy. For example, in the case of an $Li_2S$—$P_2S_5$-based sulfide solid electrolyte material, a peak of an $S_3P$—S—$PS_3$ structure ordinarily appears at 402 $cm^{-1}$. Thus, it is preferable that this peak is not detected. A peak of a $PS_4^{3-}$ structure ordinarily appears at 417 $cm^{-1}$. In the first embodiment, the intensity $I_{402}$ at 402 $cm^{-1}$ is preferably smaller than the intensity $I_{417}$ at 417 $cm^{-1}$. More specifically, the intensity $I_{402}$ is, for example, preferably 70% or less, more preferably 50% or less, and far more preferably 35% or less with respect to the intensity $I_{417}$. Also, with regard to a sulfide solid electrolyte material except $Li_2S$—$P_2S_5$-based, the situation "does not substantially contain cross-linking sulfur" may be determined by specifying a unit containing cross-linking sulfur to measure a peak of the unit.

In the case where the above-mentioned sulfide solid electrolyte material does not substantially contain $Li_2S$ and cross-linking sulfur, the sulfide solid electrolyte material ordinarily has an ortho-composition or a composition in the neighborhood thereof. Here, ortho generally signifies oxo acid which is the highest in degree of hydration among oxo acids obtained by hydrating the same oxide. In the first embodiment, a crystal composition to which $Li_2S$ is added most among sulfides is called an ortho-composition. For example, $Li_3PS_4$ corresponds to an ortho-composition in the $Li_2S$—$P_2S_5$ system, $Li_3AlS_3$ corresponds to an ortho-composition in the $Li_2S$—$Al_2S_3$ system, $Li_3BS_3$ corresponds to an ortho-composition in the $Li_2S$—$B_2S_3$ system, $Li_4SiS_4$ corresponds to an ortho-composition in the $Li_2S$—$SiS_2$ system, and $Li_4GeS_4$ corresponds to an ortho-composition in the $Li_2S$—$GeS_2$ system.

For example, in the case of an $Li_2S$—$P_2S_5$-based sulfide solid electrolyte material, the ratio of $Li_2S$ and $P_2S_5$ for obtaining an ortho-composition is $Li_2S:P_2S_5=75:25$ on a molar basis. The case of an $Li_2S$—$Al_2S_3$-based sulfide solid electrolyte material and the case of an $Li_2S$—$B_2S_3$-based sulfide solid electrolyte material are similar thereto. On the other hand, in the case of an $Li_2S$—$SiS_2$-based sulfide solid electrolyte material, the ratio of $Li_2S$ and $SiS_2$ for obtaining an ortho-composition is $Li_2S:SiS_2$=66.7:33.3 on a molar basis. The case of an $Li_2S$—$GeS_2$-based sulfide solid electrolyte material is similar thereto.

In the case where the above-mentioned raw material composition contains $Li_2S$ and $P_2S_5$, the ratio of $Li_2S$ to the total of $Li_2S$ and $P_2S_5$ is preferably within a range of 70 mol % to 80 mol %, more preferably within a range of 72 mol % to 78 mol %, and far more preferably within a range of 74 mol % to 76 mol %. The case where the above-mentioned raw material composition contains $Li_2S$ and $Al_2S_3$ and the case where the above-mentioned raw material composition contains $Li_2S$ and $B_2S_3$ are similar thereto.

On the other hand, in the case where the above-mentioned raw material composition contains $Li_2S$ and $SiS_2$, the ratio of $Li_2S$ to the total of $Li_2S$ and $SiS_2$ is preferably within a range of 62.5 mol % to 70.9 mol %, more preferably within a range of 63 mol % to 70 mol %, and far more preferably within a range of 64 mol % to 68 mol %. The case where the above-mentioned raw material composition contains $Li_2S$ and $GeS_2$ is similar thereto.

The content of Cl in a sulfide solid electrolyte material of the first embodiment is not particularly limited and preferably within a range of 0.4 mol % to 50 mol % with respect to 1 mol of a sulfide solid electrolyte material before adding Cl thereto. The reason therefor is that too small content of Cl brings a possibility that interface resistance may not sufficiently be restrained from increasing, while too large content of Cl brings a possibility that Li ion conductivity of a sulfide solid electrolyte material decrease. It is conceived that $Cl^-$ is so small in polarizability as compared with $S^{2-}$ that Li ion conductivity of a sulfide solid electrolyte material decreases. The polarizability of $Cl^-$, $Br^-$ and $I^-$ is 2.96, 4.16 and 6.43 respectively, and the polarizability of $S^{2-}$ is 5.90. The content of Br in a sulfide solid electrolyte material of the first embodiment is similar thereto.

Examples of an aspect of a sulfide solid electrolyte material of the first embodiment include a sulfide solid electrolyte material 1 (a dispersion-type sulfide solid electrolyte material) such that at least one of Cl and Br is dispersed, as shown in FIG. 3A. On the other hand, other examples of an aspect of the above-mentioned sulfide solid electrolyte material include a sulfide solid electrolyte material 1 (a covering-type sulfide solid electrolyte material) having a core portion 3 with ion conductivity and a covered portion 4 for covering the surface of the core portion 3 to contain at least one of Cl and Br, as shown in FIG. 3B. A dispersion-type sulfide solid electrolyte material has the advantage that the production is easy as compared with a covering-type sulfide solid electrolyte material. On the other hand, a covering-type sulfide solid electrolyte material has the advantage that interface resistance may be effectively restrained from increasing as compared with a dispersion-type sulfide solid electrolyte material.

With regard to a covering-type sulfide solid electrolyte material, the covered portion may be formed on at least part of the core portion surface, the covered portion is preferably formed on more areas of the core portion surface, and the covered portion is more preferably formed on the whole core portion surface. In FIG. 3B, the average thickness of the covered portion 4 is, for example, preferably within a range of 3 nm to 100 nm, and more preferably within a range of 3 nm to 20 nm. Examples of the above-mentioned covered portion include a covered portion composed of the above-mentioned Cl-containing compound or Br-containing compound, and a covered portion such that the above-mentioned core portion is chlorinated or brominated. The above-mentioned core portion may or may not have Cl and Br if it has ion conductivity. In the case of the former, a dispersion-type sulfide solid electrolyte material may be used as the core portion; in the case of the latter, a conventional sulfide solid electrolyte material (such as $Li_2S$—$P_2S_5$) may be used as the core portion.

A sulfide solid electrolyte material of the first embodiment may be amorphous or crystalline, and yet preferably amorphous. In the case where the above-mentioned sulfide solid electrolyte material has the core portion and the covered portion, the core portion may be amorphous or crystalline, and yet preferably amorphous. An amorphous sulfide solid electrolyte material may be obtained by a mechanical milling method as described later. On the other hand, a crystalline sulfide solid electrolyte material may be obtained, for example, by heat-treating an amorphous sulfide solid electrolyte material.

Examples of the shape of a sulfide solid electrolyte material of the first embodiment include a particulate. The average particle diameter of a particulate sulfide solid electrolyte material is, for example, preferably within a range of 0.1 μm to 50 μm. The above-mentioned sulfide solid electrolyte material is preferably high in Li ion conductivity, and Li ion conductivity at normal temperature is, for example, preferably $1 \times 10^{-4}$ S/cm or more, and more preferably $1 \times 10^{-3}$ S/cm or more.

A sulfide solid electrolyte material of the first embodiment may be used for optional uses in which ion conductivity is required. Above all, the above-mentioned sulfide solid electrolyte material is preferably used for a battery. In addition, in the case where the above-mentioned sulfide solid electrolyte material is used for a battery, it may be used for a cathode active material layer (a cathode body), an anode active material layer (an anode body) or an electrolyte layer.

(2) Producing Method for Sulfide Solid Electrolyte Material

Next, a producing method for a sulfide solid electrolyte material of the first embodiment is described. The producing method for the sulfide solid electrolyte material of the first embodiment is not particularly limited if it is a method for obtaining the above-mentioned sulfide solid electrolyte material. Examples of the producing method for a dispersion-type sulfide solid electrolyte material include a producing method comprising a synthesis step of amorphizing a raw material composition containing $Li_2S$, sulfide of X (X is P, Si, Ge, Al or B), and at least one of a Cl-containing compound and a Br-containing compound.

Examples of a method for amorphizing include mechanical milling and melt extraction, and mechanical milling is preferable among them. The reason therefor is that treatment at normal temperature may be performed to intend the simplification of production processes.

The mechanical milling is not particularly limited if it is a method for mixing a raw material composition while allowing mechanical energy thereto; examples thereof include ball mill, vibrating mill, turbo mill, mechano-fusion and disk mill, and ball mill is preferable among them and planetary ball mill is particularly preferable. The reason therefor is to efficiently obtain a desired sulfide solid electrolyte material.

Various kinds of the conditions of the mechanical milling are determined so as to obtain a desired sulfide solid electrolyte material. For example, in the case of using planetary ball mill, a raw material composition and a grinding ball are added and treated at predetermined number of revolutions and time. Generally, larger number of revolutions brings higher production rate of a sulfide solid electrolyte material, and longer treating time brings higher conversion ratio of a raw material composition into a sulfide solid electrolyte material. The number of weighing table revolutions in performing planetary ball mill is preferably within a range of 200 rpm to 500 rpm, for example, and within a range of 250 rpm to 400 rpm, above all. The treating time in performing planetary ball mill is preferably within a range of 1 hour to 100 hours, for example, and within a range of 1 hour to 50 hours, above all.

The above-mentioned mechanical milling may be drytype mechanical milling or wet-type mechanical milling, but yet the latter is preferable. The reason therefor is that a raw material composition may be prevented from anchoring on a wall surface of a vessel to obtain a sulfide solid electrolyte material with higher amorphism. Liquid used for wet-type mechanical milling is preferably such as to have properties for not generating hydrogen sulfide in a reaction with the above-mentioned raw material composition. Hydrogen sulfide is generated in such a manner that a proton dissociated from a molecule of the liquid reacts with a raw material composition and a sulfide solid electrolyte material. Therefore, the above-mentioned liquid preferably has such aprotic properties as not to generate hydrogen sulfide. Ordinarily, aprotic liquid may be roughly divided into polar aprotic liquid and nonpolar aprotic liquid.

The polar aprotic liquid is not particularly limited: Examples thereof include ketones such as acetone; nitriles such as acetonitrile; amides such as N,N-dimethylformamide (DMF); and sulfoxides such as dimethyl sulfoxide (DMSO).

Examples of the nonpolar aprotic liquid include alkane which is liquid at normal temperature (25° C.). The abovementioned alkane may be chain alkane or cyclic alkane. The carbon number of the above-mentioned chain alkane is preferably 5 or more, for example. On the other hand, the upper limit of the carbon number of the above-mentioned chain alkane is not particularly limited if it is liquid at normal temperature. Specific examples of the above-mentioned chain alkane include pentane, hexane, heptane, octane, nonane, decane, undecane, dodecane and paraffin. The above-mentioned chain alkane may have a branch. Specific examples of the above-mentioned cyclic alkane include cyclopentane, cyclohexane, cycloheptane, cyclooctane and cycloparaffin.

Other examples of the nonpolar aprotic liquid include aromatic hydrocarbons such as benzene, toluene and xylene; chain ethers such as diethyl ether and dimethyl ether; cyclic ethers such as tetrahydrofuran; alkyl halides such as chloroform, methyl chloride and methylene chloride; esters such as ethyl acetate; and fluorine-based compounds such as benzene fluoride, heptane fluoride, 2,3-dihydroperfluoropentane and 1,1,2,2,3,3,4-heptafluorocyclopentane. The added amount of the above-mentioned liquid is not particularly limited and may be such amount as to obtain a desired sulfide solid electrolyte material.

A heat-treating step of heat-treating the sulfide solid electrolyte material obtained in the synthesis step may be performed in the above-mentioned producing method. The reason therefor is to obtain a crystalline sulfide solid electrolyte material. The heating temperature is preferably a temperature equal to or higher than crystallizing temperature.

On the other hand, examples of the producing method for a covering-type sulfide solid electrolyte material include a producing method having a covering step of covering the surface of a sulfide solid electrolyte material as the core portion with at least one of a Cl-containing compound and a Br-containing compound. A covering-type sulfide solid electrolyte material may also be obtained in such a manner that Cl-containing gas (such as chlorine gas) or Br-containing gas (such as bromine gas) is jetted on the surface of a sulfide solid electrolyte material as the core portion to chlorinate or brominate the surface of the core portion.

2. Second Embodiment

Next, a second embodiment of a sulfide solid electrolyte material of the present invention is described. A sulfide solid electrolyte material of the second embodiment has a core portion with ion conductivity and a covered portion for covering the surface of the above-mentioned core portion, and is characterized in that the above-mentioned covered portion contains I.

The second embodiment allows a sulfide solid electrolyte material which copes with both the restraint of the increase in interface resistance and the restraint of the increase in bulk resistance for the reason that the covered portion contains I. Here, a sulfide solid electrolyte material containing iodine (I) is disclosed in the above-mentioned Non Patent Literatures 1 and 2. However, it is not described in these literatures that the covered portion for covering the core portion has iodine and iodine is effective for coping with both the restraint of the increase in interface resistance and the restraint of the increase in bulk resistance.

A sulfide solid electrolyte material of the second embodiment has the core portion 3 with ion conductivity and the covered portion 4 for covering the surface of the core portion 3 to contain I, similarly to the sulfide solid electrolyte material 1 as shown in FIG. 3B. The core portion 3 may or may not have I if it has ion conductivity. In the case of the former, a dispersion-type sulfide solid electrolyte material in which I is dispersed may be used as the core portion; in the case of the latter, a conventional sulfide solid electrolyte material (such as $Li_2S$—$P_2S_5$) may be used as the core portion.

A dispersion-type sulfide solid electrolyte material in which I is dispersed is the same as the items described in the above-mentioned "1. First embodiment" except for replacing Cl and Br with I. Examples of an I-containing compound include LiI. A covering-type sulfide solid electrolyte material is also the same as the items described in the abovementioned "1. First embodiment" except for replacing Cl and Br with I. A sulfide solid electrolyte material of the second embodiment may have the characteristics of a sulfide solid electrolyte material of the first embodiment.

B. Cathode Body

Next, a cathode body of the present invention is described. The cathode body of the present invention comprising a cathode active material and a sulfide solid electrolyte material which reacts with the above-mentioned cathode active material and forms a high resistive layer, characterized in that the above-mentioned sulfide solid electrolyte material contains at least one of Cl, Br and I.

The present invention allows a cathode body which copes with both the restraint of the increase in interface resistance and the restraint of the increase in bulk resistance for the reason that a sulfide solid electrolyte material contains at least one of Cl, Br and I.

FIG. 4 is a schematic view showing an example of a cathode body of the present invention. A cathode body 11 shown in FIG. 4 comprises a cathode active material 2a and a sulfide solid electrolyte material 1 which reacts with the cathode active material 2a and forms a high resistive layer (not shown in the drawing). A cathode body of the present invention is greatly characterized in that the sulfide solid electrolyte material 1 contains at least one of Cl, Br and I.

A cathode body of the present invention is hereinafter described in each constitution.

1. Sulfide Solid Electrolyte Material

A sulfide solid electrolyte material in the present invention reacts with a cathode active material to form a high resistive layer. The formation of a high resistive layer may be confirmed by a transmission electron microscope (TEM) and an energy-dispersive x-ray spectroscopy (EDX).

A sulfide solid electrolyte material in the present invention may be a dispersion-type sulfide solid electrolyte material or a covering-type sulfide solid electrolyte material if it contains at least one of Cl, Br and I. The above-mentioned sulfide solid electrolyte material is the same as the contents described in the above-mentioned "A. Sulfide solid electrolyte material". Here, the above-mentioned "A. Sulfide solid electrolyte material 2. Second embodiment" describes a covering-type sulfide solid electrolyte material containing I and does not describe a dispersion-type sulfide solid electrolyte material containing I; a sulfide solid electrolyte material in the present invention may be a dispersion-type sulfide solid electrolyte material containing I. The reason therefor is as follows.

That is to say, conventionally, it has not been known that a dispersion-type sulfide solid electrolyte material containing I is used for a cathode body. A dispersion-type sulfide solid electrolyte material using LiI as a starting material is disclosed in Non Patent Literatures 1 and 2; LiI is so low in electric potential at which an oxidation reaction is caused (refer to paragraphs [0028] and [0029] of Patent Literature 2) as not to be used for a cathode body conventionally. However, the present invention adopts the constitution as described above by noting compatibility between the restraint of the increase in interface resistance and the restraint of the increase in bulk resistance to determine that the effect to be obtained is larger even though decomposition of LiI or the like is caused somewhat. In the case of a dispersion-type sulfide solid electrolyte material containing I, even though LiI is used as a starting material, it is also conceived that I is dispersed so much that LiI is not decomposed at ordinary oxidation potential of LiI. A cathode active material preferably has the after-mentioned coating layer from the viewpoint of decreasing the influence of decomposition of LiI.

The content of a sulfide solid electrolyte material in a cathode body is preferably, for example, within a range of 0.1% by volume to 80% by volume, above all, within a range of 1% by volume to 60% by volume, particularly, within a range of 10% by volume to 50% by volume.

2. Cathode Active Material

Next, a cathode active material in the present invention is described. A cathode active material in the present invention is not particularly limited if it reacts with the above-mentioned sulfide solid electrolyte material to form a high resistive layer, and is preferably an oxide cathode active material, above all. A metallic element in an oxide cathode active material reacts with sulfur so more easily than oxygen as to react with sulfur in a sulfide solid electrolyte material and form sulfur metal. It is conceived that this sulfur metal itself becomes a high resistive layer while loss (decomposition) of metal ion and sulfur ion occurs in the vicinity of an interface between an oxide cathode active material and a sulfide solid electrolyte material. The use of an oxide cathode active material allows a cathode body with high energy density.

Examples of an oxide cathode active material used for a lithium solid state battery include a cathode active material represented by a general formula $Li_xM_yO_z$ (M is a transition metallic element, x=0.02 to 2.2, y=1 to 2 and z=1.4 to 4). In the above-mentioned general formula, M is preferably at least one kind selected from the group consisting of Co, Mn, Ni, V, Fe and Si, and more preferably at least one kind selected from the group consisting of Co, Ni and Mn. Examples of an oxide cathode active material include rock salt bed type active material such as $LiCoO_2$, $LiMnO_2$, $LiNiO_2$, $LiVO_2$ and $LiNi_{1/3}Co_{1/3}Mn_{1/3}O_2$, and spinel type active material such as $LiMn_2O_4$ and $Li(Ni_{0.5}Mn_{1.5})O_4$. As an oxide cathode active material, $Li_2FeSiO_4$, $Li_2MnSiO_4$ or the like may be used, and olivine type active material such as $LiFePO_4$, $LiMnPO_4$, $LiNiPO_4$, $LiCuPO_4$ or the like may be used.

A cathode active material in the present invention is preferably an active material with an electric potential of 2.8 V (vs Li) or more. In paragraph [0028] of Patent Literature 2, it is described that LiI is subject to an oxidation reaction at an electric potential of approximately 3 V; according to the Nernst equation, an oxidation reaction occurs at 2.8 V.

$$E=\Delta U_{elec}/\gamma F=270.29\times10^3/1\times96450=2.8 \ V \text{ (vs Li)}$$

Accordingly, an active material with an electric potential of 2.8 V (vs Li) or more and a sulfide solid electrolyte material using LiI as a starting material have not been combined conventionally. In particular, the electric potential of a cathode active material is preferably 3.0 V (vs Li) or more.

As shown in FIG. 5, a coating layer 5 of an oxide is preferably formed on the surface of the cathode active material 2a. The reason therefor is that a cathode active material and a sulfide solid electrolyte material may be further restrained from reacting to form a high resistive layer. In the present invention, the above-mentioned oxide is preferably an ion-conducting oxide. The reason therefor is that an ion conducts inside an ion-conducting oxide, so that resistance on the surface of a cathode active material may be decreased. Thus, a cathode body with low interface resistance may be obtained. In the case where a cathode body of the present invention is used for a lithium solid state battery, an ion-conducting oxide preferably has Li element, M element (M is a metallic element) and O element. The above-mentioned M is not particularly limited and examples thereof include Nb, Ti and Zr. In addition, specific examples of such an ion-conducting oxide include $LiNbO_3$, $Li_4Ti_5O_{12}$, $LiTiO_3$ and $Li_2ZrO_3$. On the other hand, the above-mentioned oxide may not have ion conductivity. In the case of using such an oxide, the formation of a high resistive layer may be restrained though initial properties of interface resistance may not be improved. Examples of an oxide having no ion conductivity include $TiO_2$ and $ZrO_2$.

The thickness of a coating layer is, for example, preferably within a range of 1 nm to 500 nm, and more preferably within a range of 2 nm to 100 nm. The reason therefor is that the thickness within the above-mentioned range may sufficiently restrain a cathode active material and a sulfide solid electrolyte material from reacting. Most of the surface of a cathode active material is preferably coated with a coating layer; specifically, the coverage factor is preferably 40% or more, more preferably 70% or more, and far more preferably 90% or more. Examples of a method for forming a coating layer on the surface of a cathode active material include a tumbling flow coating method (a sol-gel method), a mechano-fusion method, a CVD method and a PVD method.

Examples of the shape of a cathode active material include a particulate shape, preferably a spherical shape or an elliptically spherical shape, above all. In the case where a cathode active material is in a particulate shape, the average particle diameter thereof is, for example, preferably within a range of 0.1 µm to 50 µm. The content of a cathode active material in a cathode body is, for example, preferably within a range of 10% by volume to 99% by volume, more preferably within a range of 20% by volume to 99% by volume.

3. Cathode Body

A cathode body of the present invention may further comprise at least one of a conductive material and a binder in addition to a cathode active material and a sulfide solid electrolyte material. Examples of the conductive material include acetylene black, Ketjen Black and carbon fiber. Examples of the binder include fluorine-containing binders such as PTFE and PVDF. The thickness of the above-mentioned cathode body is, for example, preferably within a range of 0.1 µm to 1000 µm. Examples of a method for forming a cathode body include a method for compression-molding a material composing a cathode body. The above-mentioned cathode body is ordinarily used for a battery and preferably used for a solid state battery, above all.

C. Lithium Solid State Battery

Next, a lithium solid state battery of the present invention is described. The lithium solid state battery of the present invention comprises a cathode active material layer, an anode active material layer, and a solid electrolyte layer formed between the above-mentioned cathode active material layer and the above-mentioned anode active material layer, characterized in that the above-mentioned cathode active material layer is the above-mentioned cathode body.

The present invention allows a lithium solid state battery which copes with both the restraint of the increase in interface resistance and the restraint of the increase in bulk resistance by reason of using the above-mentioned cathode body as a cathode active material layer.

FIG. 6 is a schematic cross-sectional view showing an example of a lithium solid state battery of the present invention. A lithium solid state battery 20 shown in FIG. 6 comprises: a cathode active material layer 11 containing a cathode active material, an anode active material layer 12 containing an anode active material, a solid electrolyte layer 13 formed between the cathode active material layer 11 and the anode active material layer 12, a cathode current collector 14 for collecting the cathode active material layer 11, an anode current collector 15 for collecting the anode active material layer 12, and a battery case 16 for storing these members. The present invention is greatly characterized in that the cathode body described in the above-mentioned "B. cathode body" is used for the cathode active material layer 11.

A lithium solid state battery of the present invention is hereinafter described in each constitution.

1. Cathode Active Material Layer

A cathode active material layer in the present invention is the same as the contents described in the above-mentioned "B. cathode body"; therefore, the description will not be repeated here.

2. Anode Active Material Layer

Next, an anode active material layer in the present invention is described. The anode active material layer in the present invention is a layer containing at least an anode active material, and may further contain at least one of a solid electrolyte material, a conductive material and a binder as required.

In the present invention, a solid electrolyte material contained in the anode active material layer is preferably the sulfide solid electrolyte material described in the above-mentioned "A. Sulfide solid electrolyte material". The content of the above-mentioned sulfide solid electrolyte material in the anode active material layer is preferably, for example, within a range of 0.1% by volume to 80% by volume, above all, within a range of 1% by volume to 60% by volume, and particularly, within a range of 10% by volume to 50% by volume.

Examples of the anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. The content of the anode active material in the anode active material layer is, for example, preferably within a range of 10% by volume to 99% by volume, and more preferably within a range of 20% by volume to 99% by volume.

Examples of the conductive material include acetylene black, Ketjen Black and carbon fiber. Examples of the binder include fluorine-containing binders such as PTFE and PVDF. The thickness of the anode active material layer is preferably within a range of 0.1 µm to 1000 µm, for example.

3. Solid Electrolyte Layer

Next, a solid electrolyte layer in the present invention is described. The solid electrolyte layer in the present invention is a layer formed between the cathode active material layer and the anode active material layer, and a layer composed of a solid electrolyte material. The solid electrolyte material contained in the solid electrolyte layer is not particularly limited if it has Li ion conductivity.

In the present invention, a solid electrolyte material contained in the solid electrolyte layer is preferably the sulfide solid electrolyte material described in the above-mentioned "A. Sulfide solid electrolyte material". The reason therefor is that the formation of a high resistive layer may be prevented on an interface with the cathode active material layer. The content of the above-mentioned sulfide solid electrolyte material in the solid electrolyte layer is not particularly limited if it is a ratio for obtaining desired insulation properties, and is preferably within a range of 10% by volume to 100% by volume, for example, and within a range of 50% by volume to 100% by volume, above all. In particular, in the present invention, the solid electrolyte layer is preferably composed of only the above-mentioned sulfide solid electrolyte material.

The solid electrolyte layer may contain a binder. The reason therefor is that the solid electrolyte layer with flexibility may be obtained by containing a binder. Examples of the binder include fluorine-containing binders such as PTFE and PVDF. The thickness of the solid electrolyte layer is preferably within a range of 0.1 µm to 1000 µm, for example, and within a range of 0.1 µm to 300 µm, above all.

4. Other Constitutions

A lithium solid state battery of the present invention comprises at least the above-mentioned cathode active material layer, anode active material layer and solid electrolyte layer, and moreover, ordinarily further comprises a cathode current collector for collecting the cathode active material layer and an anode current collector for collecting the anode active material layer. Examples of a material for the cathode current collector include SUS, aluminum, nickel, iron, titanium and carbon, while preferably SUS among them. On the other hand, examples of a material for the anode current collector include SUS, copper, nickel and carbon, while preferably SUS among them. The thickness and shape of the cathode current collector and the anode current collector are preferably selected properly in accordance with uses of a lithium solid state battery. A battery case of a general lithium solid state battery may be used for a battery case used for the present invention. Examples of the battery case include a battery case made of SUS.

5. Lithium Solid State Battery

A lithium solid state battery of the present invention may be a primary battery or a secondary battery, however preferably a secondary battery among them. The reason therefor is to be repeatedly charged and discharged and be useful as a car-mounted battery, for example. Examples of the shape of a lithium solid state battery of the present invention include a coin shape, a laminate shape, a cylindrical shape and a rectangular shape.

A producing method for a lithium solid state battery of the present invention is not particularly limited if it is a method for obtaining the above-mentioned lithium solid state battery, and the same method as a producing method for a general lithium solid state battery may be used. Examples of a producing method for a lithium solid state battery include a method such that a material composing a cathode active material layer, a material composing a solid electrolyte layer and a material composing an anode active material layer are sequentially pressed to thereby produce a power generating element and this power generating element is stored inside a battery case, which is swaged. The present invention may also provide each of an anode active material layer (an anode body) and a solid electrolyte layer, characterized by containing the sulfide solid electrolyte material described in the above-mentioned "A. Sulfide solid electrolyte material".

The present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

(1) Synthesis of Sulfide Solid Electrolyte Material

Lithium sulfide ($Li_2S$), diphosphorus pentasulfide ($P_2S_5$) and lithium chloride (LiCl) were used as a starting material. Next, $Li_2S$ and $P_2S_5$ were weighed in a glove box under an Ar atmosphere (a dew point of −70° C.) so as to become a molar ratio of $75Li_2S \cdot 25P_2S_5$ ($Li_3PS_4$, ortho-composition). Next, LiCl was weighed so as to become a molar ratio of $Li_3PS_4$:LiCl=100:0.43. Projected into a vessel of planetary ball mill (45 cc, made of $ZrO_2$) was 2 g of this mixture, dehydrated heptane (a moisture amount of 30 ppm or less, 4 g) was projected thereinto, and $ZrO_2$ ball (φ=5 mm, 53 g) was projected thereinto to completely seal the vessel (an Ar atmosphere). This vessel was mounted on a planetary ball milling machine (P7™ manufactured by Fritsch Japan Co., Ltd.) to perform mechanical milling for 40 hours at the number of weighing table revolutions of 370 rpm. Thereafter, the obtained sample was dried in a vacuum to obtain a glassy sulfide solid electrolyte material.

(2) Production of Lithium Solid State Battery

First, the obtained sulfide solid electrolyte material and $LiCoO_2$ (a cathode active material) coated with $LiNbO_3$ with a thickness of 7 nm were mixed at a weight ratio of cathode active material:sulfide solid electrolyte material=7:3 to obtain a cathode composite. Next, $75Li_2S \cdot 25P_2S_5$ amorphous substance (a sulfide solid electrolyte material) and graphite (an anode active material) were mixed at a weight ratio of anode active material:sulfide solid electrolyte material=5:5 to obtain an anode composite. A lithium solid state battery was obtained by using the obtained cathode composite, anode composite and the $75Li_2S \cdot 25P_2S_5$ amorphous substance prepared as a solid electrolyte layer-forming material.

Example 2

A lithium solid state battery was obtained in the same manner as Example 1 except for modifying the ratio of $Li_3PS_4$ and LiCl into a molar ratio of $Li_3PS_4$:LiCl=100:4.3.

Example 3

A lithium solid state battery was obtained in the same manner as Example 1 except for replacing LiCl with LiI.

Example 4

A lithium solid state battery was obtained in the same manner as Example 2 except for replacing LiCl with LiI.

Example 5

A lithium solid state battery was obtained in the same manner as Example 1 except for replacing LiCl with LiI and modifying into a molar ratio of $Li_3PS_4$:LiI=100:43.

Comparative Example 1

A lithium solid state battery was obtained in the same manner as Example 1 except for not using LiCl.

Comparative Example 2

A lithium solid state battery was obtained in the same manner as Example 1 except for replacing LiCl with $LiPF_6$ and modifying the ratio of $Li_3PS_4$ and $LiPF_6$ into a molar ratio of $Li_3PS_4$:$LiPF_6$=100:0.7.

Comparative Example 3

A lithium solid state battery was obtained in the same manner as Comparative Examples 2 except for modifying the ratio of $Li_3PS_4$ and $LiPF_6$ into a molar ratio of $Li_3PS_4$:$LiPF_6$=100:6.

[Evaluation]

(Impedance Measurement)

Impedance measurement was performed by using the lithium solid state battery obtained in Examples 1 to 4 and Comparative Examples 1 to 3. First, the lithium solid state battery was charged. The charging conditions were the conditions of charging up to 3.7 V by CCCV. After charging, interface resistance (initial) and bulk resistance (initial) were measured by impedance measurement with an alternating current impedance method. Solartron 1260™ was used for the measurement and the measurement conditions were a voltage amplitude of ±10 mV, a measuring frequency of 1

Figure 7:
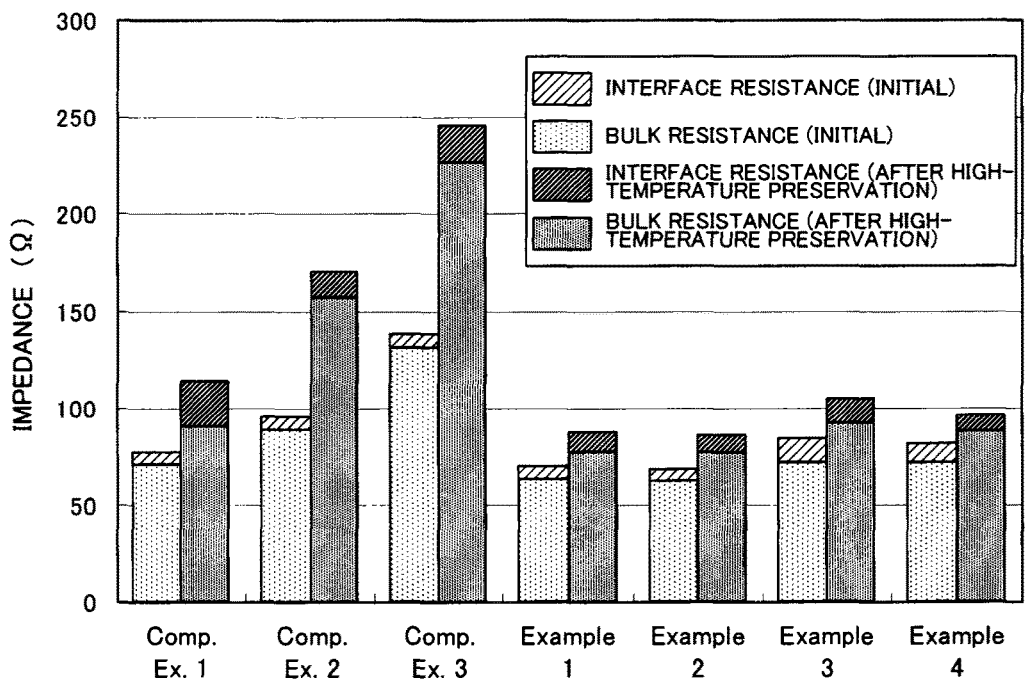
FIG. 7 is a result of measuring impedance for a lithium solid state battery obtained in Examples 1 to 4 and Comparative Examples 1 to 3.
Figure 9:
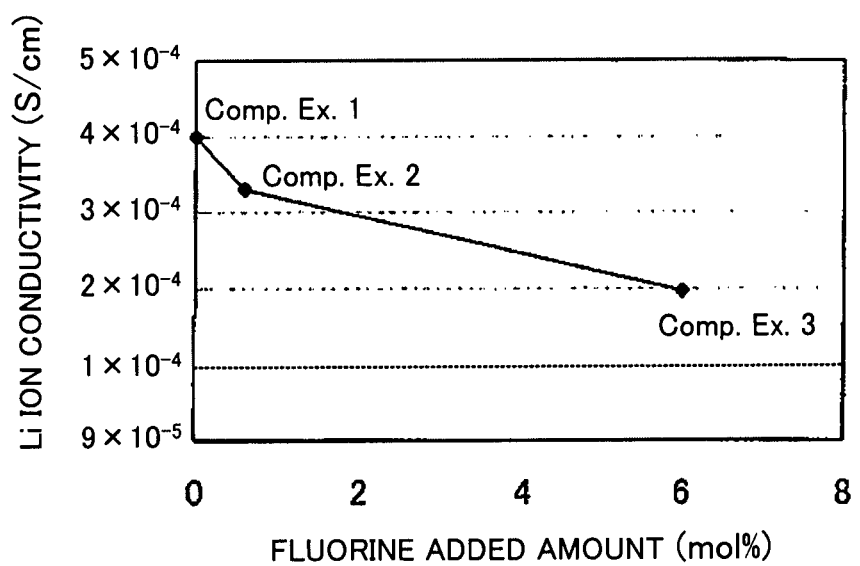
FIG. 9 is a result of measuring Li ion conductivity for a sulfide solid electrolyte material synthesized in Comparative Examples 1 to 3.

MHz to 0.1 Hz, and 25° C. Thereafter, the lithium solid state battery after the above-mentioned impedance measurement was preserved under an environment of 60° C. for 20 days. After preserving, the lithium solid state battery was placed under an environment of 25° C. for 2 hours to subsequently measure interface resistance (after high-temperature preservation) and bulk resistance (after high-temperature preservation) by impedance measurement on the same conditions as the above. The results are shown in FIG. 7 and TABLE 1.

ion conductivity of the sulfide solid electrolyte materials synthesized in Comparative Examples 1 to 3 was measured by an alternating current impedance method. Solartron 1260™ was used for the measurement and the measurement conditions were a voltage amplitude of ±5 mV, a measuring frequency of 1 MHz to 0.1 Hz, and 25° C. The results are shown in FIG. 9. As shown in FIG. 9, it was confirmed that Li ion conductivity deteriorated as fluorine added amount increased.

TABLE 1

|  | Additional Element | Added Amount | State | Bulk Resistance ($\Omega$) | Interface Resistance ($\Omega$) |
|---|---|---|---|---|---|
| Comparative Example 1 | — | — | Initial<br>After High-Temperature Preservation | 71.1<br>90.7 | 6.0<br>23.0 |
| Comparative Example 2 | Fluorine | 0.7 mol % | Initial<br>After High-Temperature Preservation | 88.4<br>157.0 | 7.0<br>12.8 |
| Comparative Example 3 | Fluorine | 6 mol % | Initial<br>After High-Temperature Preservation | 131.3<br>226.1 | 7.7<br>19.3 |
| Example 1 | Chlorine | 0.43 mol % | Initial<br>After High-Temperature Preservation | 63.1<br>77.5 | 7.1<br>10.2 |
| Example 2 | Chlorine | 4.3 mol % | Initial<br>After High-Temperature Preservation | 62.4<br>77.3 | 6.4<br>9.0 |
| Example 3 | Iodine | 0.43 mol % | Initial<br>After High-Temperature Preservation | 71.5<br>92.3 | 12.4<br>13.2 |
| Example 4 | Iodine | 4.3 mol % | Initial<br>After High-Temperature Preservation | 71.5<br>88.1 | 10.4<br>8.6 |

In FIG. 7 and TABLE 1, it was confirmed that the addition of F restrained interface resistance after high-temperature preservation from increasing in comparing Comparative Examples 1 to 3. On the other hand, the addition of F rendered the increase of bulk resistance notable. On the contrary, in Examples 1 to 4, it was confirmed that interface resistance after high-temperature preservation was restrained from increasing and also bulk resistance after high-temperature preservation was restrained from increasing.

(Evaluation of Charge-Discharge Cycle Characteristics)

Figure 8:
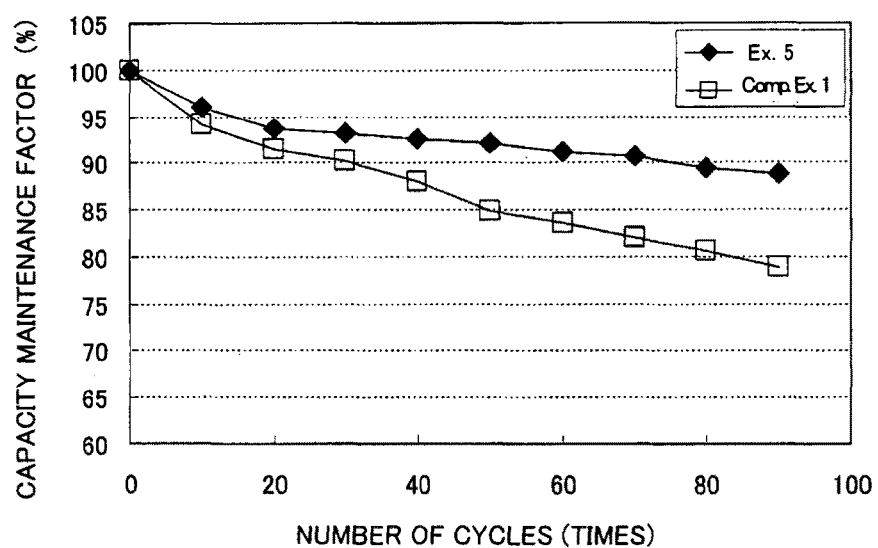
FIG. 8 is a result of evaluating charge-discharge cycle characteristics for a lithium solid state battery obtained in Example 5 and Comparative Example 1.

The evaluation of charge-discharge cycle characteristics was performed by using the lithium solid state battery obtained in Example 5 and Comparative Example 1. The charge-discharge conditions were the conditions of CC-charging up to 4.1 V and CC-discharging up to 3.0 V at 0.1 C. The results are shown in FIG. 8. As shown in FIG. 8, it was confirmed with regard to Example 5 that capacity maintenance factor shifted high and cycle characteristics were favorable, as compared with Comparative Example 1.

(Influence of Fluorine Addition on Li Ion Conductivity)

The influence of fluorine addition on Li ion conductivity was examined by using the sulfide solid electrolyte material synthesized in Comparative Examples 1 to 3. Specifically, Li Reference Example 1

Structural stability was calculated for a structure such that S of $Li_3PS_4$ was substituted with F by a molecular orbital method (Gaussian03: Mp2/6-311G(d,p)). Specifically, structural stability was calculated for $Li_3PS_3F$, $Li_2PS_3F$, $Li_2PS_2F_2$, $LiPS_2F_2$, $LiPSF_3$ and $PSF_3$. As a result, it was found that $Li_3PS_3F$ might exist stably and it was suggested that a $PS_4^{3-}$ structure was destroyed by F.

Reference Examples 2 to 4

Structural stability was calculated for a structure such that S of $Li_3PS_4$ was substituted with each of Cl, Br and I by a molecular orbital method (Gaussian03:Mp2/6-311G(d,p)). The targeted substitution structure is the same as Reference Example 1. As a result, it was found that any structure might not exist stably and it was suggested that a $PS_4^{3-}$ structure was not destroyed by Cl, Br and I.

REFERENCE SIGNS LIST

1 . . . sulfide solid electrolyte material
2 . . . electrode active material
2a . . . cathode active material
3 . . . core portion 4 . . . covered portion
11 . . . cathode active material layer
12 . . . anode active material layer
13 . . . solid electrolyte layer
14 . . . cathode current collector
15 . . . anode current collector
16 . . . battery case
20 . . . lithium solid state battery

The invention claimed is:

1. A sulfide solid electrolyte material for a lithium solid state battery, comprising Li, P, S, and at least one of Cl, Br, and I,
wherein the sulfide solid electrolyte material does not substantially contain $Li_2S$ and cross-linking sulfur, and at least one of the Cl, Br, and I is dispersed around a $PS_4^{3-}$ structure.

2. A cathode body for a lithium solid state battery, comprising an oxide cathode active material and a sulfide solid electrolyte material,
wherein the sulfide solid electrolyte material is the sulfide solid electrolyte material for a lithium solid state battery according to claim 1.

3. The cathode body for a lithium solid state battery according to claim 2,
wherein the oxide cathode active material is a rock salt bed type active material.

4. The cathode body for a lithium solid state battery according to claim 2,
wherein a coating layer of an oxide is formed on a surface of the oxide cathode active material.

5. A lithium solid state battery comprising a cathode active material layer, an anode active material layer, and a solid electrolyte layer formed between the cathode active material layer and the anode active mate layer,
wherein the cathode active material layer is the cathode body for a lithium solid state battery according to claim 2.

6. The sulfide solid electrolyte material for a lithium solid state battery according to claim 1,
wherein an $Li_2S$ peak is not observed by X-ray diffraction, and
an intensity $I_{402}$ at 402 $cm^{-1}$ is 35% or less with respect to an intensity $I_{417}$ at 417 $cm^{-1}$ by Raman spectroscopy.

7. The sulfide solid electrolyte material for a lithium solid state battery according to claim 1,
wherein an amount of the $PS_4^{3-}$ structure in all anion structures of the sulfide solid electrolyte material is 50 mol % or more.

* * * * *